United States Patent Office 3,642,956
Patented Feb. 15, 1972

3,642,956
PROCESS FOR THE MANUFACTURE OF NEUTRAL POLYPHOSPHORIC ACID ESTERS FROM $P_2O_5$ AND ORTHOCARBONIC ACID ESTERS
Klaus-Dieter Kampe and Edgar Fischer, both c/o Farbwerke Hoechst AG, Frankfurt am Main, Germany
No Drawing. Continuation of application Ser. No. 504,187, Oct. 23, 1965. This application Apr. 15, 1969, Ser. No. 817,280
Claims priority, application Germany, Oct. 28, 1964, F 44,326
Int. Cl. C07f 9/08, 7/02
U.S. Cl. 260—920
1 Claim

ABSTRACT OF THE DISCLOSURE

A process has been provided for producing neutral polyphosphoric acid ester derivatives which comprises reacting an acid ester with phosphorus pentoxide at a temperature within the range of $-78°$ C. to $+140°$ C., in the absence of moisture and in a mole ratio of ester to phosphorus pentoxide from 0.02 to 3 moles ester to 1 mole phosphorus pentoxide, said acid ester being defined by the formula $$(R')_m—C(OR)_n$$

wherein $m+n=4$ in which Formula R represents a saturated, unsaturated, oxalkylated, or halogenated aliphatic radical of 1 to 12 carbon atoms, or an aromatic radical of 1 to 12 carbon atoms, and R' represents a hydrogen, a saturated, unsaturated, oxalkylated, or halogenated aliphatic or cycloaliphatic radical of 1 to 12 carbon atoms or an aromatic radical of 1 to 12 carbon atoms. The compounds are useful as catalysts for the production of polyacetals.

---

This application is a combination of application Ser. No. 504,187, filed Oct. 23, 1965, now abandoned.

The present invention relates to a process for the manufacture of neutral polyphosphoric acid ester derivatives.

It is known that neutral polyphosphoric acid esters can be obtained by reacting alkyl or aryl esters of phosphoric acid with phosphorus pentoxide whereby oily compounds are formed which cannot be distilled. This process has the disadvantage that the unreacted proportions of the starting products can be separated from the reaction product only with difficulty at elevated temperatures. At temperatures above $120°$ C., however, neutral polyphosphoric acid esters, except methyl esters, begin to decompose. The said process is not, therefore, suited for the manufacture of polyphosphoric acid esters that are free from phosphate and phosphoric or polyphosphoric acid. It is furthermore known that tetrameric cyclic polyphosphoric acid esters are formed by the reaction of phosphorus pentoxide with diethyl ether in chloroform. In this process, a definite mixture of two known compounds is formed; the reaction requires, however, a relatively long time, which is inconvenient especially for the manufacture of relatively large amounts of these polyphosphoric acid esters. Moreover, the course of the reaction depends to a large extent on the quality of the phosphorus pentoxide used.

Now we have found that derivatives of polyphosphoric acid esters can be obtained in an advantageous manner by reacting nonmetallic acid esters of nonmetals of Groups III, IV and VI of the Mendeleeff Periodic Table or mixtures of these nonmetallic acid esters, if desired in the presence of a solvent, at a temperature within the range of $-78°$ C. and $140°$ C. with phosphorus pentoxide.

The term "nonmetallic acid esters" is used herein to mean compounds of the elements boron, carbon, silicon and sulfur which correspond to one of the following Formulae I to IV.

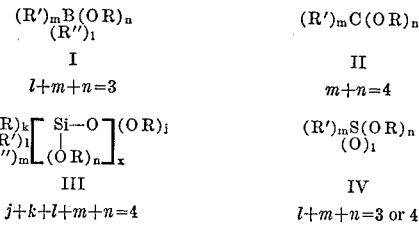

in which R represents a saturated or unsaturated, oxalkylated or halogenated aliphatic radical or an aromatic radical, R' and R" each represent a saturated or unsaturated, oxalkylated or halogenated aliphatic or cycloaliphatic radical or an aromatic radical. In Formula II, R' may also represent a hydrogen atom. R, R' and R" may be identical or different and may each contain 1 to 12 carbon atoms. As oxalkylated aliphatic radicals there are advantageously used methoxy, ethoxy, propoxy or butoxyalkyl radicals. As halogenated aliphatic radicals, mono-haloalkyl groups may be advantageously used. Furthermore, in the above Formulae I to IV, $j$, $k$, $l$, $m$ and $n$ are whole numbers or zero and must be such that the equations given below the said formulae be fulfilled, and $n$ must be greater than zero in Formulae I, II and IV; in Formula III $x$ is a whole or fractional number of at least one. Fractional numbers are obtained when, in the case of polyorthosilicic acid esters, mixtures of such esters are used for the reaction.

Nonmetallic acid esters suitable for use in the process of the invention are, for example, $B(OR)_3$, $R'B(OR)_2$, $R'R"BOR$, $C(OR)_4$, $HC(OR)_3$, $Si(OR)_4$, $R'Si(OR)_3$, $R'R"Si(OR)_2$, $R'_3SiOR$, $(RO)_3Si—O—Si—(OR)_3$, $$(RO)_3Si—[O—Si(OR)_2]_n—O—Si(OR)_3$$

$OS(OR)_2$, and $R'SO_2(OR)$ in which R, R' and R" have the meanings given above.

Nonmetallic acid esters particularly suitable for use are, for example, compounds of the formula $R'R"Si(OR)_2$ in which R, R' and R" represent methyl or ethyl groups, or mixtures of such compounds. There may further be used hexa-ethyl-di-orthosilicate and ethylpoly-orthosilicate. It is also possible to use trimethyl, triethyl or tripropyl esters of orthoboric acid or the corresponding esters of alkylboric acids in which the alkyl group contains 1 to 4 carbon atoms, or mixtures of such compounds for the reaction with phosphorus pentoxide.

The nonmetallic acid esters are added in a pure state or in the presence of one of the solvents indicated below at a temperature within the range of −78° C. to +140° C., advantageously −30° C. to +100° C., preferably under an inert gas, for example nitrogen, and with as complete an exclusion of moisture as possible, to phosphorus pentoxide in a pure state or in the form of a mixture thereof with one of the solvents named below. The reaction mixture so obtained is stirred or vigorously mixed thoroughly at a temperature within the range indicated above. The reaction time depends on the reactivity of the nonmetallic acid ester and the reaction temperature and varies within a few minutes (about 3 to 10 minutes) and about 48 hours. The nonmetallic acid ester is advantageously used in a molar ratio within the range of 0.005 to 20 moles, advantageously the molar amounts set forth in the table given below for each mole of phosphorus pentoxide.

In the first column of the table, the type of nonmetallic acid ester used is indicated, R, R' and R'' having the meanings given above. The second column indicates the range of the molar amounts of the nonmetallic acid esters within which the nonmetallic acid ester is reacted, for example, with 1 mole of phosphorus pentoxide. Polyorthosilicic acid alkyl esters, in which the alkyl groups may range from methyl to n-pentyl groups, are used in an amount of 0.25 to 3 units of weight for each unit of weight of phosphorus pentoxide.

TABLE

| Type of nonmetallic acid ester: | Range of molar amounts of nonmetallic acid ester/mole $P_2O_5$ |
|---|---|
| $B(OR)_3$ | 0.05–3 |
| $RB(OR)_2$ | 0.1–5 |
| $R'R''BOR$ | 0.2–9 |
| $C(OR)_4$ | 0.02–2.5 |
| $HC(OR)_3$ | 0.05–3 |
| $R'C(OR)_3$ | 0.05–3 |
| $Si(OR)_4$ | 0.02–2.5 |
| $(RO)_3Si\text{—}O\text{—}Si(OR)_3$ | 0.01–2.0 |
| $R'Si(OR)_3$ | 0.05–3 |
| $R'R''Si(OR)_2$ | 0.1–5 |
| $R'_3SiOR$ | 0.2–9 |
| $OS(OR)_2$ | 0.05–5 |
| $R'SO_2OR$ | 0.2–9 |

As solvents, halogenated hydrocarbons boiling between 35° C. and 120° C. may be used. Advantageously chloroform, methylene chloride or 1,1,1-trichlorethane are used. It is, however, also possible to carry out the reaction in the presence of, for example, carbon tetrachloride, methylene bromide, symmetrical or asymmetrical dichlorethane, 1,1,2-trichlorethane, trichlorethylene, tetrachlorethylene, trifluorotrichlorethane or symmetrical difluorotetrachlorethane or mixtures of these compounds. The solvents are advantageously used in an anhydrous or alcohol-free state in an amount within the range of 1 to 300 parts by weight, advantageously 7 to 50 parts by weight, for each part by weight of phosphorus pentoxide.

It is advantageous to carry out the reaction and also the work-up with as complete an exclusion of moisture as possible.

The polyphosphoric acid ester derivatives formed are obtained after the reaction in the form of a solution or, if the reaction is carried out without a solvent, in the form of viscous oils intermingled with unreacted $P_2O_5$. In the latter case it is advantageous to dissolve the oils by adding a solvent since solutions can be worked up particularly well. The solutions can be separated from the solid substance by suction filtration and freed from solvent and unreacted nonmetallic acid ester under reduced or strongly reduced pressure at a temperature of the bath of below 110° C. It is also possible to precipitate the dissolved polyphosphoric acid ester derivatives by adding a liquid precipitating agent. The supernatant solvent containing the unreacted proportions of starting product and other impurities, is decanted. This procedure of dissolving and precipitation may be repeated as often as desired to remove undesirable impurities substantially quantitatively from the polyphosphoric acid ester derivatives. As precipitating agents, low molecular weight alkanes and cycloalkanes with 5 to 12 carbon atoms which are liquid at room temperature may advantageously be used. Examples of such compounds are hexane, heptane, octane and cyclohexane. Aliphatic or cyclic ethers, for example, diethyl ether, tetrahydrofurane, glycol dimethyl ether, dioxane and benzene may also be used as precipitating agents. The nonmetallic acid esters are in general sufficiently soluble in the organic solvents used as precipitating agents and are highly soluble in the solvent mixtures comprising halogenated hydrocarbons and precipitating agents, which are formed in the precipitating process. The precipitation of dissolved polyphosphoric acid ester derivatives may also be used for fractionating the products by precipitating fractions with different degrees of solubility one after the other by adding different amounts of precipitating agent. Fractions that have been obtained in this manner differ from one another with respect to their catalytic activity. The polyphosphoric acid ester derivatives are obtained in the form of a colourless to slightly yellowish viscous oil which cannot be distilled or in the form of an amorphous solid mass.

The polyphosphoric acid ester derivatives constitute mixed anhydrides of partially hydrolyzed polyphosphoric acid esters with partially or completely hydrolyzed nonmetallic acid esters. These mixed anhydrides contain a mixture of open-chain, cyclic and combined open-chain/cyclic molecules with polyphosphate structures in which phosphorus-oxygen-nonmetal bonds are statistically distributed. The content of such P-O-nonmetal groupings depends chiefly on the molar ratio in which the starting products have been reacted with one another. It is, however, also influenced by the reaction temperature and depends also on the individual nonmetals themselves. The nonmetal atom in the mixed polyphosphoric acid ester anhydrides may be linked to phosphorus atoms via all single-bond oxygen functions present in the nonmetallic acid ester or via only a part of these oxygen bonds. In the latter case the remaining nonmetal-oxygen-single bonds still carry the radicals present in the starting ester. The following general formulae represent two of the numerous possible molecule sections of such polyphosphoric acid ester anhydrides, radicals R and R' having the meanings given above.

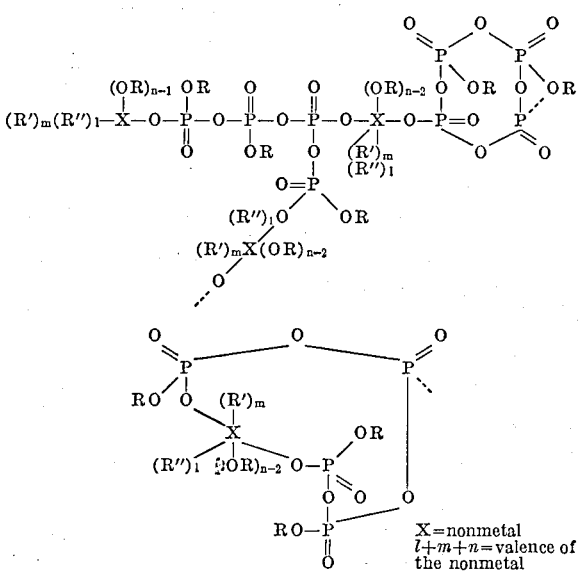

X = nonmetal
$l+m+n$ = valence of the nonmetal

The nonmetallic acid esters partially give off their OR groups only for the splitting of the $P_4O_{10}$ structure into neutral polyphosphoric acid ester parts, the nonmetal parent atom not being incorporated in or added to the polymer phosphate. The extent of this type of reaction depends on the reaction conditions and is most pronounced in sulfites. The elementary composition of the polyphosphoric acid ester anhydrides depends, therefore, not only on the molar ratio of the starting components but may vary strongly with the reaction conditions and the type of nonmetal used.

As compared with the known neutral polyphosphoric acid esters, the mixed polyphosphoric acid ester anhydrides of the invention have a considerably improved catalytic action when used, instead of acids or Lewis acids, as catalysts for proton-catalyzed reactions. Moreover, the catalytic action of the polyphosphoric acid ester anhydrides obtained in accordance with the invention can be graduated by means of a different content of nonmetals other than phosphorus.

The mixed polyphosphoric acid ester anhydrides made in accordance with the invention can be used as catalysts for proton-catalyzed reactions such as, for example, biochemical polycondensation reactions or polymerization reactions, for example, in the field of polyacetals. They make also appropriate intermediates for the manufacture of insecticides.

The following examples serve to illustrate the invention but they are not intended to limit it thereto.

EXAMPLE 1

6.97 grams (49 millimoles) phosphorus pentoxide and 20 cc. pure chloroform were introduced into a groundglass flask of a capacity of 100 cc., under an atmosphere of dry nitrogen and with the exclusion of moisture. The reaction mixture so obtained was kept on a bath having a temperature of +20° C. and 3.5 grams (24 millimoles) triethyl borate were quickly added dropwise from a pipet, while shaking. The reaction mixture was kept for about 30 minutes on the bath having a temperature of 20° C., while shaking occasionally. The bath was then withdrawn and shaking was continued for a further 6 hours at room temperature. The reaction mixture was then separated from undissolved proportions by suction filtration and the solution was concentrated by evaporation under a reduced pressure of 3 millimeters of mercury on a bath having a temperature of 50° C. until a constant weight was obtained. 9.3 grams of a tough colourless glassy mass which was readily soluble in the usual chlorinated hydrocarbons were obtained.

Composition in percent: B, 3.3; P, 24.7; C, 21.4; H, 4.6.

EXAMPLE 2

Under the conditions of Example 1, 18.3 grams (125 millimoles) triethyl borate were added to a mixture of 17.82 grams (125 millimoles) phosphorus pentoxide and 40 cc. chloroform. The mixture so obtained was shaken for 24 hours at room temperature until substantially all of the phosphorus pentoxide had undergone reaction. To facilitate filtration the reaction mixture was diluted with 50 cc. chloroform and suction-filtered. The filtrate was concentrated in vacuo on a bath having a temperature of 50° C. 25.5 grams of a tough colourless glassy product were obtained.

Composition in percent: B, 3.3; P, 22.8; C, 23.0; H, 5.1.

EXAMPLE 3

12.5 grams of the colourless glassy product obtained by the reaction described in Example 2 were dissolved in 30 cc. chloroform. To the solution so obtained 30 cc. heptane were added while shaking, whereby a white amorphous product (fraction I) was gradually precipitated. The supernatant solution was decanted. The amorphous residue was shaken with 50 cc. of a mixture of 5 parts by volume of heptane and 1 part by volume of chloroform and allowed to deposit and the solution was decanted. This procedure was carried out three times. The amorphous residue was freed from solvent in vacuo at a temperature of the bath of 50° C. 7.0 grams of an amorphous solid white product which was very hygroscopic and deliquesced rapidly in the air (fraction I) were obtained.

Composition in percent: B, 4.8; P, 19.7; C, 18.9; H, 4.3.

To the solution which had been decanted in the precipitation of fraction I 30 cc. heptane were added whereby further proportions of a solid amorphous product (fraction II) were precipitated. Fraction II was worked up and washed in the same manner as fraciton I. By evaporating the solvent in vacuo at a temperature of the bath of 50° C., a solid amorphous mass which was deliquescent in the air was obtained (fraction II).

Composition in percent: B, 4.7; P, 8.5; C, 18.0; H, 4.8.

EXAMPLE 4

Under the conditions described in Example 1, 4 grams (21 millimoles) tri-n-propyl borate were added to a mixture of 6.2 grams (43 millimoles) phosphorus pentoxide and 30 cc. chloroform. The reaction mixture so obtained was heated overnight at +40° C., while stirring. The reaction mixture was then suction-filtered and the filtrate was concentrated in vacuo at a temperature of the bath of 40° C. until a constant weight was obtained. 7.3 grams of a tough slightly yellowish glassy mass which was easily soluble in chloroform were obtained.

Composition in percent: B, 3.1; P, 18.2; C, 31.3; H, 6.4.

EXAMPLE 5

In the manner described in Example 1, 8.56 grams (37 millimoles) tri-n-butyl-borate were added to a mixture of 5.25 grams (37 millimoles) phosphorus pentoxide and 30 cc. methylene chloride. The whole was shaken over-night at 20° C. and then worked up as described in Example 1. By evaporating under a pressure of 0.1 millimeter of mercury at a temperature of the bath of 35° C. until a constant weight had been obtained, 12.55 grams of a tough colourless glassy product were obtained. The product was very easily soluble in the usual chlorinated hydrocarbons and in mixtures of such compounds with, for example, heptane in a proportion by volume of 1:8.

Composition in percent: B, 2.9; P, 17.7; C, 36.2; H, 7.1.

A sample heated for 10 hours at 90° C. under a pressure of 0.1 millimeter of mercury had the following composition as determined by analysis: B, 3.1%; P, 17.8%; C, 36.0%; H, 6.9%. Consequently, the polyphosphoric acid ester derivative was not decomposed at that temperature.

EXAMPLE 6

In the manner described in Example 1, 10.5 grams (45 millimoles) tris-[2-methoxyethyl]-borate were added to a mixture of 6.46 grams (45 millimoles) phosphorus pentoxide and 20 cc. chloroform. The reaction mixture acquired a slightly yellowish colouration and was heated for 24 hours at 40° C. The phosphorus pentoxide was not dissolved completely. The reaction mixture was suction-filtered and the solution was concentrated to about 15 cc. 60 cc. heptane were added whereby a colourless oil was precipitated. The supernatant solution was poured off and the oil remaining behind was digested twice with 50 cc. of a mixture of 5 parts by volume of heptane and 1 part by volume of chloroform. The residual proportions of solvent were removed by heating in vacuo at 40° C. 6.2 grams of a colourless amorphous mass were obtained.

Composition in percent: B, 3.6; P, 8.4; C, 36.3; H, 7.4.

EXAMPLE 7

Under the conditions described in Example 1, 13.8 grams (47.5 millimoles) triphenyl borate were added to a mixture of 6.77 grams (47.5 millimoles) $P_2O_5$ and 30 cc. chloroform and the whole was heated for 24 hours at 80° C. The reaction mixture was then separated from the brown solid substance by suction filtration. The solution was concentrated to 10 cc. and 100 cc. heptane were added. A yellowish oil precipitated which, after decantation of the supernatant solution, was washed and freed from solvent in vacuo as described in Example 6. 16.2 grams of a yellowish amorphous mass were obtained.

Composition in percent: B, 3.0; P, 12.9; C, 50.2; H, 4.1.

EXAMPLE 8

2.93 grams (16 millimoles) triallyl borate were added at —20° C., under dry nitrogen, to a mixture of 5.10 grams (36 millimoles) phosphorus pentoxide and 30 cc. chloroform and the whole was shaken at 0° C. for 48 hours. The reaction mixture acquired a brown colour; the reaction with $P_2O_5$ was incomplete since the $P_2O_5$ was superficially covered with small amounts of resinous by-products which formed and thus impeded a further reaction. The reaction mixture was suction-filtered and the solution was concentrated in vacuo to 20 cc. and admixed with 90 cc. heptane. A yellow-brown oil precipitated. It was washed and freed from solvent as described in Exmaple 6. 4.1 grams of a brownish viscous oil were obtained.

Composition in percent: P, 11.1; C, 35.5; H, 5.6.

EXAMPLE 9

7.3 grams (50 millimoles) triethyl borate and 11.5 grams (50 millimoles) tri-n-butyl borate were added to a mixture, kept at —10° C., of 10.32 grams (75 millimoles) phosphorus pentoxide and 50 cc. methylene chloride. The phosphorus pentoxide dissolved completely within a few minutes. After having been kept at —10° C. for about 30 minutes, the reaction mixture was shaken for a further 3 hours at room temperature. The reaction mixture was then concentrated under a pressure of 0.1 millimeter of mercury at a temperature of the bath of 40° C. until a constant weight was obtained. 17.9 grams of a viscous colourless oil were obtained.

Composition in percent: B, 3.6; P, 18.3; C, 25.7; H, 5.6.

EXAMPLE 10

Under the conditions of Example 1, 1.53 grams (15 millimoles) ethylboric acid dimethyl ester

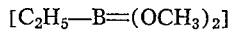

$[C_2H_5—B=(OCH_3)_2]$ were added to a mixture at 0° C. of 4.25 grams (30 millimoles) phosphorus pentoxide and 10 cc. methylene chloride. After 30 minutes the temperature of the reaction mixture was allowed to rise to room temperature and the reaction mixture was shaken at that temperature for 4 hours. The reaction mixture was then separated from undissolved proportions by suction filtration and the solution was concentrated as described in Example 9. 4.6 grams of a viscous colourless oil were obtained.

Composition in percent: B, 2.7; P, 25.3; C, 22.3; H, 4.9.

EXAMPLE 11

In the manner described in Example 10, 1.78 grams (10 millimoles) phenylboric acid diethyl ester

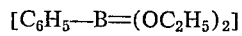

$[C_6H_5—B=(OC_2H_5)_2]$ were added at 0° C. to a mixture of 5.37 grams (38 millimoles) phosphorus pentoxide and 30 cc. methylene chloride and the whole was shaken vigorously. After 10 minutes, the temperature of the reaction mixture was allowed to rise to room temperature and the reaction mixture was shaken at that temperature for a further 6 hours. The reaction mixture was then diluted with 50 cc. methylene chloride and separated from undissolved proportions by suction filtration. The solution was concentrated in vacuo to about 10 cc. and 70 cc. hexane were added, whereby an amorphous white product was precipitated. The latter was washed like the solid fractions described in Example 3 and freed from residual proportions of solvent by drying in vacuo at a temperature of bath of 60° C.

The product contained 1.3% of boron.

EXAMPLE 12

2.13 grams (11 millimoles) tetraethyl orthocarbonate were added dropwise under nitrogen, while stirring, to a mixture at —30° C. of 3.14 grams (22 millimoles) phosphorus pentoxide and to 10 cc. chloroform. After 10 minutes, the temperature of the reaction mixture was allowed to rise to room temperature and the mixture was then heated for 4 hours at 60° C. The reaction mixture was separated from small proportions of unreacted $P_2O_5$ by suction filtration and the solution was then evaporated under a pressure of 0.1 millimeter of mercury at a temperature of the bath of 70° C. until a constant weight was obtained. About 4 grams of a viscous colourless oil were obtained.

Composition in percent: P, 27.7; C, 22.1; H, 4.9.

EXAMPLE 13

Under the conditions described in Example 12, 9.32 grams (63 millimoles) triethyl orthoformate were added to a mixture of 8.96 grams (63 millimoles) phosphorus pentoxide and 40 cc. chloroform. After 10 minutes the reaction mixture was heated for 6 hours at 40° C. The phosphorus pentoxide dissolved completely. The solvent was evaporated in vacuo at a temperature of the bath of 60° C. A colourless oil was obtained.

Composition in percent: P, 25.8; C, 23.3; H, 5.1.

EXAMPLE 14

1.33 grams (9 millimoles) triethyl orthoformate were added to a mixture at 0° C. of 6.34 grams (44.5 millimoles) phosphorus pentoxide and 30 cc. carbon tetrachloride. The temperature of the reaction mixture was allowed to rise to room temperature within 15 minutes. The reaction mixture was then shaken for 10 hours at room temperature and then separated from unreacted proportions of phosphorus pentoxide by suction filtration. The solution was concentrated under a pressure of 0.1 millimeter of mercury at a temperature of the bath of 40° C. until a constant weight had been obtained. A viscous oil was obtained.

Composition in percent: P, 37.3; C, 22.6; H, 4.9.

EXAMPLE 15

Under the conditions described in Example 12, 22.7 grams (154 millimoles) triethyl orthoformate were added to a mixture of 7.32 grams (51.5 millimoles) phosphorus pentoxide and 10 cc. methylene chloride. The temperature of the reaction mixture was allowed to rise to 0° C. within 20 minutes and the reaction mixture was then shaken at that temperature for 3 hours. The $P_2O_5$ dissolved completely. The methylene chloride was distilled off in vacuo at a temperature of the bath of 20° C. The solution was then heated under a pressure of 0.05 millimeter of mercury at a temperature of the bath of 40° C. until a constant weight was obtained. The oil so obtained had the following composition in percent: P, 16.2; C, 37.4; H, 7.4.

EXAMPLE 16

10 grams (49 millimoles) tetraethyl orthosilicate were added dropwise to a mixture at 0° C. for 14.2 grams (100 millimoles) phosphorus pentoxide and 20 cc. chloroform under dry nitrogen. During the introduction of the tetraethyl orthosilicate, the mixture was cooled on an ice water bath. The reaction was strongly exothermic. The $P_2O_5$ had reacted within a few minutes. A viscous solution containing insoluble proportions was obtained, which was diluted with 200 cc. chloroform to facilitate filtration. The reaction mixture was suction-filtered and the solution was concentrated. A soft amorphous crumbly product was obtained. The product was comminuted, 200 cc. of a mixture of 2 parts by volume of heptane and 1 part by volume of chloroform were added and the whole was shaken for 6 hours. After suction filtration, the solid amorphous white filtrate was freed from solvent in vacuo at a temperature of the bath of 80° C. A white amorphous mass (fraction I) was obtained.

Composition in percent: Si, 3.7; P, 19.7; C, 24.7; H, 5.9.

The solid residue left behind in the first suction filtration of the reaction mixture was also comminuted, washed and freed from solvent as described above. A white amorphous mass (fraction II) was obtained.

Composition in percent: Si, 8.1; P, 18.2; C, 11.0; H, 2.6.

Fraction I was sparingly soluble and fraction II difficultly soluble in chloroform.

EXAMPLE 17

4.0 grams (11.5 millimoles) hexaethyl-di-orthosilicate were added to a mixture at 20° C. of 4.70 grams (33 millimoles) phosphorus pentoxide and 20 cc. chloroform and the whole was shaken at room temperature for 6 hours. A transparent stiff gel was obtained; the $P_2O_5$ had been consumed quantitatively. The chloroform was evaporated in vacuo. A white amorphous mass which was easily soluble in chloroform was obtained.

Composition in percent: Si, 7.6; P, 21.4; C, 22.3; H, 5.2.

EXAMPLE 18

6.6 grams ethyl polyorthosilicate were added to a mixture at 20° C. of 8.07 grams (58 millimoles) $P_2O_5$ and 20 cc. chloroform and the whole was shaken for 6 hours at room temperature. The gel-like mass which had been formed (the $P_2O_5$ had been consumed quantitatively) was concentrated in vacuo. A white amorphous mass was obtained which was easily soluble in chlorinated hydrocarbons.

EXAMPLE 19

6.3 grams (52 millimoles) dimethyl-dimethoxysilane [$(CH_3)_2Si(OCH_3)_2$] were added dropwise, while stirring, under dry nitrogen to a mixture at —20° C. of 7.45 grams (52 millimoles) $P_2O_5$ and 20 cc. chloroform. After 20 minutes the temperature of the reaction mixture was allowed to rise to room temperature. The phosphorus pentoxide reacted quantitatively. The solvent was evaporated in vacuo at a temperature of the bath of 40° C. until a consant weight was obtained. A viscous colourless oil was obtained.

Composition in percent: Si, 9.3; P, 22.7; C, 16.0; H, 4.3.

EXAMPLE 20

Under the conditions described in Example 19, 1.44 grams (12 millimoles) dimethyldimethoxysilane were added to a mixture of 6.74 grams (47.5 millimoles) phosphorus pentoxide and 10 cc. methylene chloride. After 10 minutes the temperature of the reaction mixture was allowed to rise to room temperature and the reaction mixture was shaken for a further 5 hours. It was then diluted with 20 cc. methylene chloride and separated from undissolved proportions by suction filtration. 50 cc. heptane were added to the solution whereby an oily colourless product was precipitated. The supernatant solution was decanted and the oil was washed and freed from residual proportions of solvent in vacuo as described in Example 3. An amorphous solid white mass was obtained.

Composition in percent: Si, 6.2; P, 32.8; C, 12.4; H, 3.2.

EXAMPLE 21

14.2 grams (130 millimoles) dimethyl sulfite were added, under nitrogen and with the exclusion of moisture, to a mixture of 18.34 grams (130 millimoles) phosphorus pentoxide for 6 hours at 60° C. The reaction mixture was separated from unreacted phosphorus pentoxide by suction filtration. The solution was concentrated in vacuo at a temperature of the bath of 80° C. until a constant weight was obtained. 20.2 grams of a viscous colourless oil were obtained.

Composition in percent: S—; P, 31.4; C, 14.3; H, 3.7.

EXAMPLE 22

In the manner described in Example 21, 7.64 grams (54 millimoles) phosphorus pentoxide and 3.58 grams (32 millimoles) dimethyl sulfite were reacted in the presence of 10 cc. chloroform. After heating for 6 hours at 60° C., the reaction mixture was cooled to room temperature and 60 cc. of heptane were then added. The oil which had precipitated was washed and freed from residual proportions of solvent as described in Example 6, a viscous colourless oil being obtained.

EXAMPLE 23

19.2 grams (175 millimoles) methanesulfonic acid methyl ester were added, under nitrogen and with the exclusion of moisture, to a mixture of 12.4 grams (87.5 millimoles) phosphorus pentoxide and 10 cc. methylene chloride, and the whole was heated under reflux for 5 hours. A further 20 cc. methylene chloride were then added and the solution was separated from the solid substance by suction filtration. The filtrate was concentrated to about 10 cc. in vacuo and 50 cc. absolute ether were then added, whereby a yellowish oil was precipitated. The oil was allowed to deposit and the supernatant solution was decanted. The oil was digested twice with 50 cc. absolute ether and then free under a pressure of 1 millimeter of mercury at a temperature of the bath of 50° C. from residual solvent. 18.3 grams of a yellowish viscous oil were obtained.

Composition in percent: S, 16.8; P, 19.0; C, 12.2; H, 3.2.

We claim:
1. A process for producing neutral polyphosphoric acid ester derivatives which comprises reacting an acid ester with phosphorus pentoxide at a temperature within the range of —78° C. to +140° C., in the absence of moisture and in a mole ratio of ester to phosphorus pentoxide from 0.02 to 3 moles ester to 1 mole phosphorus pentoxide, said acid ester being defined by the formula

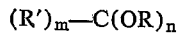

wherein $m+n=4$, and in which formula R' represents hydrogen or alkyl of 1 to 2 carbon atoms and R represents alkyl of 1 to 2 carbon atoms.

References Cited

Brannock: "Jour. of Am. Chem. Soc.," vol. 73, pp. 4953–4 (1951).

CHARLES B. PARKER, Primary Examiner

A. H. SUTTO, Assistant Examiner

U.S. Cl. X.R.

260—448.8 R, 615 A, 922, 947, 980

UNITED STATES PATENT OFFICE
CERTIFICATE OF CORRECTION

Patent No. 3,642,956        Dated February 15, 1972

Inventor(s) Kampe and Fischer

It is certified that error appears in the above-identified patent and that said Letters Patent are hereby corrected as shown below:

In the Heading:

After "am Main, Germany" insert --, assignors to Farbwerke Hoechst Aktiengesellschaft vormals Meister, Lucius & Bruning, Frankfurt am Main, Germany--

Signed and sealed this 8th day of August 1972.

(SEAL)
Attest:

EDWARD M. FLETCHER, JR.          ROBERT GOTTSCHALK
Attesting Officer                Commissioner of Patents